A. C. HOTTENROTH.
EXPANSIBLE SCREW, BOLT, OR NAIL.
APPLICATION FILED SEPT. 3, 1914.
1,138,219.
Patented May 4, 1915.
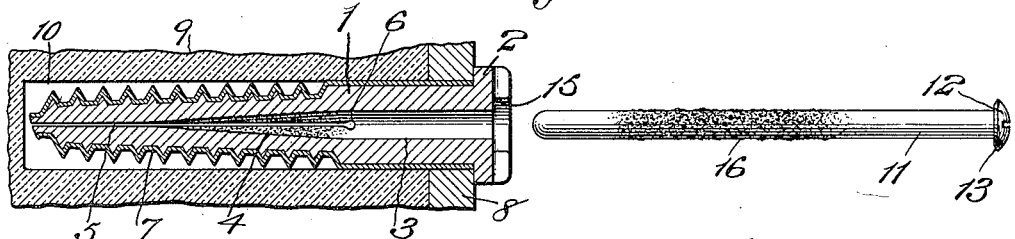
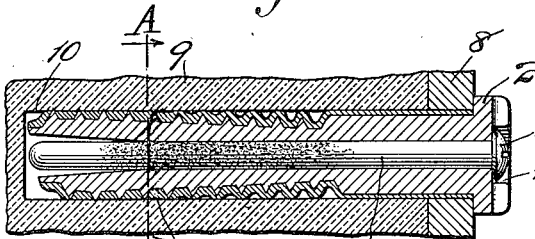
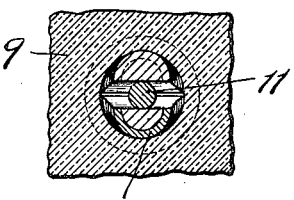
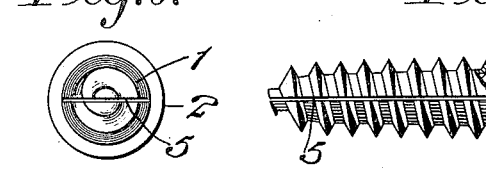
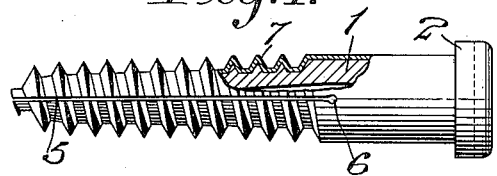
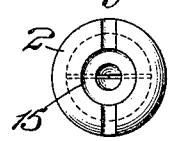
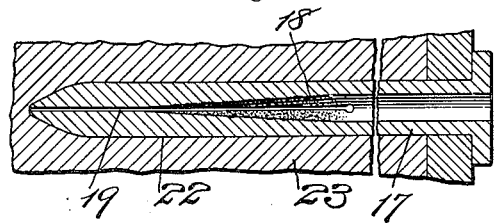
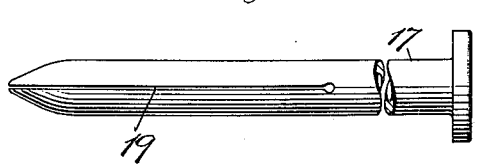
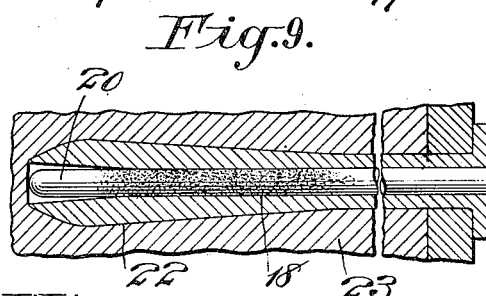
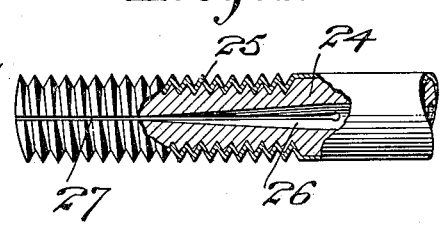
Witnesses:
Harry G. Fleischer
F. George Barry
Inventor:
Adolph C. Hottenroth
by attorneys
Brown & Durand

UNITED STATES PATENT OFFICE.

ADOLPH C. HOTTENROTH, OF FREEPORT, NEW YORK.

EXPANSIBLE SCREW, BOLT, OR NAIL.

1,138,219.     Specification of Letters Patent.    Patented May 4, 1915.

Application filed September 3, 1914. Serial No. 860,048.

*To all whom it may concern:*

Be it known that I, ADOLPH C. HOTTENROTH, a citizen of the United States, and resident of Freeport, in the county of Nassau and State of New York, have invented a new and useful Improvement in Expansible Screws, Bolts, or Nails, of which the following is a specification.

This invention relates to improvements in expansible screws, bolts or nails for securing objects to suitable supports, such as tile, plaster, brick or wood, whereby the element engages the object directly and is itself locked permanently in a hole or recess made for it, by the insertion of a fastening means, such as a pin, passing through its center which does not engage any part of the support.

One object of this invention is to provide an anchor which may be used for the particular purpose for which it is intended, and furthermore, to provide an additional means whereby it may be permanently anchored either against rotation or withdrawal.

Another object is to provide a divided screw, bolt or nail with a covering of ductile metal, whereby the covering will be crowded or flowed into the hole or recess by expanding the divided ends of the screw without the harder metal engaging the tile, plaster or brick, thereby preventing the same from breaking.

A practical embodiment of my invention is represented in the accompanying drawings, in which, Figure 1 represents a longitudinal central section taken through a portion of the tile or wall, an object to be secured thereto and a screw inserted in the tile with the fastening means in position to be inserted in the screw, Fig. 2 represents a view of the same, showing the fastening means inserted and the screw forced to its locking position, Fig. 3 represents a section taken in the plane of the line A—A of Fig. 2, Fig. 4 represents a side elevation of my improved screw, Fig. 5 represents an end elevation of the same looking at the shank end, Fig. 6 represents an end elevation looking at the head end, Fig. 7 represents a side elevation of my improved nail, Fig. 8 represents a longitudinal central section taken through a portion of the wall, an object to be screwed thereto and the nail inserted in the wall in position to be anchored therein, Fig. 9 represents a view of the same, showing the fastening means inserted in the nail anchored in the wall, Fig. 10 represents a detail section of a portion of a machine screw or bolt with my improvement applied thereto.

Referring to the structure shown in Figs. 1 to 6 inclusive, I have shown a screw having a shank denoted by 1 and a head 2. The screw is hollowed out to form a longitudinal bore having parallel walls 3 at the outer end developing into convergent walls 4 leading inwardly therefrom and terminating into parallel abutting walls at its inner end. The construction and location of this central bore is such that it leaves the shank with a full complement of metal at the inner end where the greatest strength is required. The shank 1 is divided longitudinally at 5 to a point 6, and is provided with an exterior covering 7 of ductile metal which will flow to a considerable extent when crowded by the harder metal foundation of the screw.

To secure an object 8 to a tile 9, as shown in Figs. 1, 2 and 3, a hole 10 is drilled to receive the shank 1 which fits therein. A fastening means, in the present instance a pin 11 having a head 12 inwardly beveled as shown at 13, is inserted into the longitudinal bore until the inner end engages the tapered portion 4, which pin, when forced farther into the bore, will spread the divided shank 1 outwardly from the point 6, thereby crowding the ductile metal against the walls of the hole 10. When the head 12 is seated in position it will rest within a recess 15 countersunk in the head 2 of the screw. The recess 15 serves to guard the head of the pin, when seated therein, from unintentional displacement. The pin 11 may be provided with a roughened surface as shown at 16. The longitudinal bore may also be roughened so as to coact with the roughened surface of the pin. The roughening of the surfaces of both the pin and the bore gives a firmer hold and prevents unintentional displacement due to vibration or shock given to the object or the tile, etc.

It will be understood that where the wall is soft like a plaster or brick wall, the ductile metal covering 7 of the screw will bite into the plaster or brick rather than flow and crowd the space in the hole of the glass or porcelain tile. Where the screw is used in the softer material, the divided shank will be expanded into an oval shape in cross section, thereby anchoring the screw against rotation as well as withdrawal. Where the screw is used in the glass or porcelain tile, the ductile metal is so displaced and crowded as to prevent any accidental removal therefrom.

To remove the screw from the tile, the pin 11 may be pried up with a sharp pointed lever which is entered in the kerf of the head 2 and beneath the bevel 13. When the pin is withdrawn, the divided shank will close, permitting the shank to be readily removed from the tile.

Referring to the structure shown in Figs. 7 to 9 inclusive, I have represented a nail 17 having a longitudinal tapered bore 18 and a divided inner end 19. A pin 20 having a head 21, is inserted in the longitudinal bore 18, spreading the divided end 19 and locking the nail 17 within the hole 22 in the wall or other support 23. To remove the nail 17 from the hole 22, in the wall 23, the pin 20 may be levered out with a pry placed under the beveled head 21 or it may be withdrawn with an ordinary pair of pincers. When the pin 20 is removed, the grip on the hole by the divided end 19 will be relaxed and the nail 17 readily removed without buckling or tearing the hole 22.

The structure shown in Fig. 10 discloses a machine bolt 24 having a ductile covering 25, a longitudinal central tapered bore 26 and a divided shank 27. This structure is operated in the same manner as previously described in connection with screw or nail.

It is obvious that where the grip of the expansible screw, bolt or nail is not required to be put to its extreme capacity, a fastening means of smaller diameter may be inserted into the longitudinal bore, which means does not expand the divided end so far, thereby reducing the grip of the shank in the hole. It will be also understood that the ductile metal will only be placed on the screws, bolts or nails when I find it necessary to absorb a part of the expanding force given to the divided shank and to where the hard foundation metal of the shank is liable to split or break the hole in the tile. Furthermore, the expansion of the divided shank will crowd or flow the ductile metal into the roughened or uneven surface of the hole and serve to anchor the shank more securely within the hole.

It is evident that slight changes might be resorted to in the form, construction and arrangement of the parts without departing from the spirit and scope of my invention; hence I do not wish to limit myself strictly to the structure herein shown, but

What I claim is:

1. An article of the character described comprising a head, a shank having a longitudinally divided inner end and a central bore, said bore having parallel walls at its outer end developing into convergent walls and terminating in parallel abutting walls at its inner end, and a pin for engaging the convergent and abutting walls for spreading the divided end of the shank.

2. An article of the character described comprising a head, a shank having a longitudinally divided inner end and a central bore, said bore having parallel walls at its outer and inner ends connected by convergent walls, a pin for spreading the divided portion of the shank and a covering of ductile metal of uniform thickness for said shank.

3. An article of the character described comprising a head having a recess and a kerf therein, a shank having a longitudinally divided inner end and a central bore, said bore having parallel walls at its outer and inner ends connected by convergent walls, and a pin provided with a head and adapted to engage the convergent walls to spread the divided portion of the shank before the head enters the recess.

4. An article of the character described comprising a head having a recess and a kerf therein, a shank having a longitudinally divided inner end and a central bore, said bore having parallel walls at its outer and inner ends connected by convergent walls, and a pin provided with a beveled head and adapted to engage the convergent walls to spread the divided portion of the shank before the head enters the recess.

In testimony that I claim the foregoing as my invention I have signed my name, in presence of two witnesses, this 2nd day of September, 1914.

ADOLPH C. HOTTENROTH.

Witnesses:
LIDA M. EGBERT,
F. GEORGE BARRY.